Sept. 15, 1959 B. McKIM ET AL 2,904,636

TELEPHONE CIRCUIT USING MAGNETIC CORES

Filed Dec. 22, 1955 3 Sheets-Sheet 1

INVENTORS B. McKIM
R. J. STAPLETON

BY [signature]

ATTORNEY

Sept. 15, 1959 B. McKIM ET AL 2,904,636

TELEPHONE CIRCUIT USING MAGNETIC CORES

Filed Dec. 22, 1955 3 Sheets-Sheet 2

INVENTORS B. McKIM R. J. STAPLETON

BY [signature]

ATTORNEY

INVENTORS B. McKIM
R. J. STAPLETON
BY [signature]
ATTORNEY

United States Patent Office 2,904,636
Patented Sept. 15, 1959

2,904,636

TELEPHONE CIRCUIT USING MAGNETIC CORES

Burton McKim, Morristown, and Richard J. Stapleton, Orange, N.J., assignors to Bell Telephone Laboratories, Incorporated, New York, N.Y., a corporation of New York Application December 22, 1955, Serial No. 554,675

16 Claims. (Cl. 179—18)

This invention relates generally to information handling systems and more particularly to magnetic core arrangements in such systems for detecting, counting and registering signal impulses.

In many present day information handling systems, such as may be used in computers, automatic telephone systems and the like, continuous effort is being made to improve the characteristics of circuits used for counting and registering information signals. In systems of this type constant improvement is being sought to increase the speed of response and the reliability of such counting and registering circuits. Further, it is desirable in many applications of such systems to produce counting and registering circuits which will permit the information stored therein to be read out more than once without changing or destroying the character of the stored information.

In the telephone field in particular, impulse counting and registering arrangements find frequent use, such as, in an originating register, a function of which is to receive, detect, count and register dial pulses transmitted thereto by a calling subscriber during the initiation by the latter of a request for a connection. It is the improvement of such arrangements with which the present invention in one of its forms finds utility by improving the speed of response of such originating registers, by simplifying such registers and by enabling the information stored in such registers to be repeatedly read out without destroying the information status of the registers.

An exemplary embodiment of the present invention is shown herein as incorporated in an automatic telephone system which may be of the type disclosed in Patent 2,585,904, dated February 19, 1952, to A. J. Busch. Busch discloses in detail a crossbar system wherein originating register circuits are used for transmitting dial tone to calling subscribers, for counting the pulses of called digits, for registering the called digits and for seizing an idle marker circuit for the purpose of having such a marker complete the desired connection. Since the persent invention relates solely to pulse counting and registering circuits, only those portions of an originating register have been disclosed and described herein. A skeletonized disclosure of the Busch system including an originating register circuit in some detail is shown in Patent 2,616,974, dated November 4, 1952 to J. W. Dehn. The Busch and Dehn disclosures may be referred to for such details, if any, as needed for the incorporation of the present invention in a more complete system.

It will be understood by those skilled in the art that the invention is not necessarily so limited in its utility that it must be used as a part of an originating register. It can be applied in any organization wherein the rapid detection, counting and registering of pulses is required and wherein nondestructive readout of stored information is desired.

It is a general object of this invention to improve signal impulse counting and registering circuits.

Another object of the invention is to increase the speed of operation of an impulse counting and registering arrangement suitable for use in a telephone dialing circuit.

Another object of this invention is to utilize improved magnetic storage elements having a plurality of stable states in an impulse counting and registering circuit so as to eliminate the many tubes or relays that have been required in the prior art.

A still further object of this invention is to utilize magnetic cores having nondestructive readout in an impulse counting and registering circuit to enable information stored herein to be demonstrated without disturbing the magnetic state of the register circuits.

These and other objects are realized in an illustrative embodiment of this invention which comprises a source of pulses, a circuit for counting the pulses received from the source, a register circuit controlled by the counting circuit for holding and indicating information in accordance with the count contained in the counting circuit and multi-frequency signaling means for reading out the information stored in the register.

In the specific embodiment of the invention illustrated herein, the source of pulses comprises a telephone dial which may be operated by a calling subscriber to transmit the digits of the called number to an originating dial pulse register circuit for establishing a connection between the calling station and the desired line or trunk. The operation of the dial generates a plurality of pulses corresponding to the dialed digit, which pulses are transmitted over a pulse frequency dividing circuit to a step-type magnetic core counting circuit. The counter comprises a plurality of bistable magnetic cores, of which all but the first are in the normal condition and the first core is in the set condition. The pulses received alternately over a pair of conductors from the dial pulsing circuit shift each core in succession from the set to the normal state and shift the next succeeding core in the counter from the normal to the set state. At the end of a digit, one core of the counter will be in the set state and the remaining cores all will be in the normal state. The set core places an output pulse on a lead corresponding to the digit dialed in the register circuit to set the particular three of the five register cores that are associated with the dialed digit.

The register circuit comprises a plurality of stages of magntic cores wherein each stage registers one of the dialed digits. Each core in the register circuit is constructed to permit readout without destruction of the information stored therein. Each core comprises an outer rectangular loop of soft iron and a central crossbar of high remanence iron and has a geometry and magnetic properties such that the outer rectangle is saturated when the crossbar is magnetized. The register cores have the properties of an ordinary transformer when the high remanence center crossbar is not magnetized and of a very poor transformer when the center crossbar is magnetized. Initially all of the cores in the register are in the demagnetized state. In response to each dialed digit received and counted by the counter, three-out-of-five of the cores in each stage in the register circuit are set in accordance with the dialed digit. Thus the remaining two out of the five cores of each stage are left to act as ordinary transformers for readout purposes.

In accordance with one aspect of this invention the digit stored in a register stage may be read out by the application of signals of different frequencies to the cores of the stage. These signal frequencies may be derived from individual oscillators or from frequency dividing or multiplying means as is known in the art. Each frequency is applied to windings of only one core of the stage. The signals on the two cores that were not set by the counter output are transmitted through the cores by transformer action and may be detected by any appropriate signal discriminating means. The signals of the remaining three frequencies effectively are blocked by the poor transformer characteristics of the set cores. Thus, each digit may be associated with two distinct frequencies and read out of the magnetic core stages of the register a number of times without resetting the cores or disturbing the digit information stored in the register. This aspect of the invention is a highly important one in many types of data handling systems, as, for example, in an automatic telephone system where frequently the equipment in one office must examine the digits dialed one or more times and subsequently transfer these digits to another office.

In accordance with a feature of this invention, a plurality of digits, each manifested by a number of pulses corresponding thereto, is generated by a dial, received by a magnetic core counting circuit and stored in a magnetic core register wherein the magnetic state of the register cores is determined by the information condition of the counting circuit.

It is a further feature of this invention that the digital information stored in the magnetic cores of the register be repeatedly read out of the register without destroying the information condition of the register cores.

It is a still further feature of this invention that the cores of the magnetic core register exhibit the characteristics of an ordinary transformer when in the normal or demagnetized state and the characteristics of a very poor transformer when in the set or magnetized state.

It is another feature of this invention that the magnetic core counting circuit transfer the digit manifested therein by setting three-out-of-five of the magnetic cores in a register stage to the magnetized state, thereby having the remaining two cores of the stage in the normal or demagnetized state.

It is another feature of this invention to read out the digit stored in the magnetic core register by applying a signal of unique frequency to each of the cores of a register stage, the transformer action of only the demagnetized cores therein permitting only the signal frequencies associated therewith to be passed through the register and detected.

A complete understanding of this invention and of the above and other features thereof may be gained from consideration of the following detailed description, together with the accompanying drawing, in which.

To facilitate the understanding of the invention the disclosure has been simplified by omitting all portions of an originating register circuit not embodied in the present invention. The details omitted from the present description as unnecessary for a complete understanding of the invention are fully disclosed in the above-identified Busch and Dehn patents and are incorporated herein by reference.

In describing the sensing operation of the storage elements employed in this invention the term "read" is used and is to be understood as referring to the function of determining the character of the particular information stored in the storage elements in the form of representative magnetic states. Similarly, the term "write" is used to mean the introduction into a storage element of particular information in the form of a representative magnetic state.

Figures 1, 4, 5:
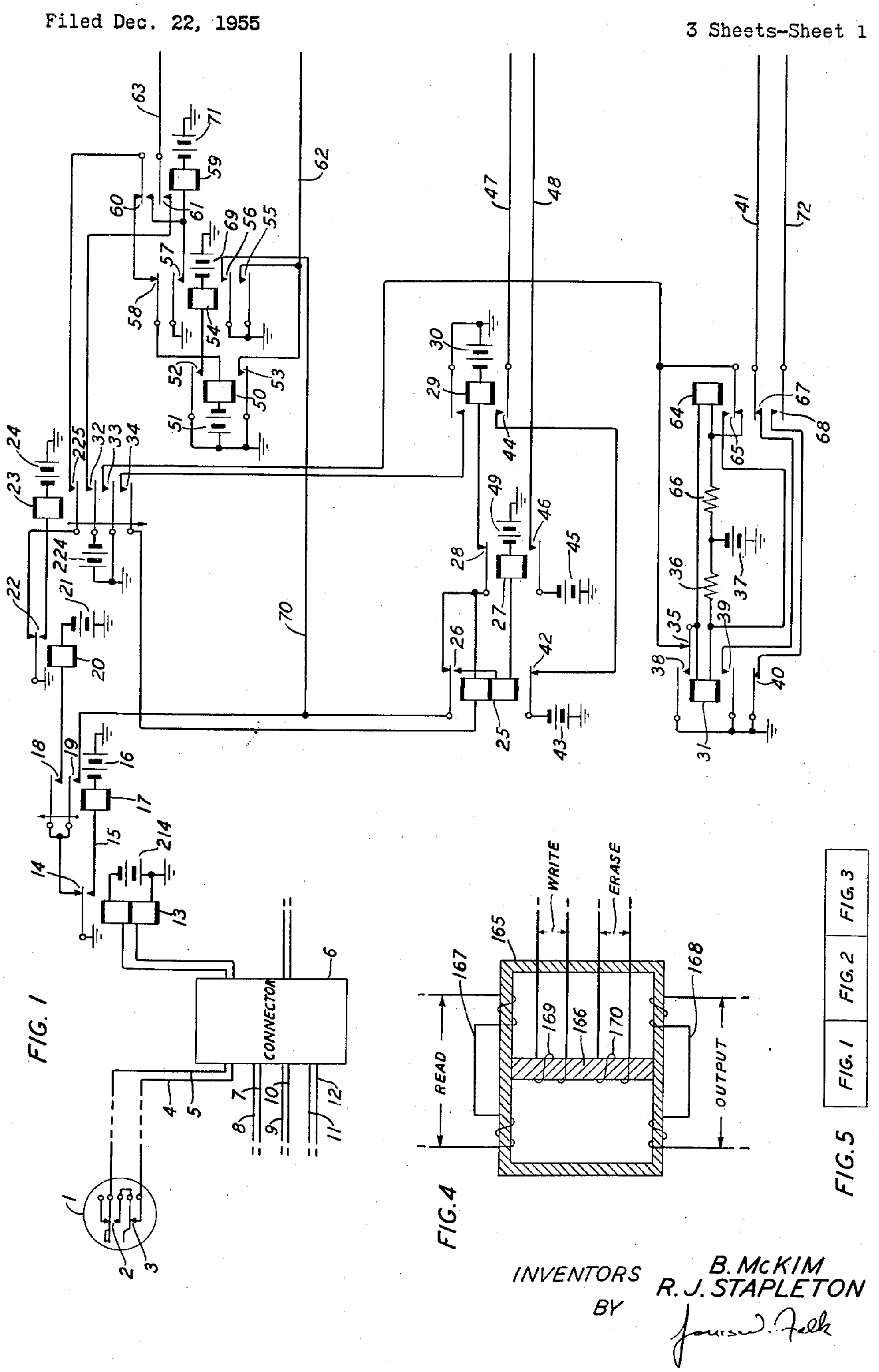
Fig. 1 is a simplified schematic representation of a subscriber dial and pulsing circuit which may be employed in a signaling arrangement in accordance with the invention.
Fig. 4 depicts a magnetic core having non-destructive readout of the type utilized in the circuit of Fig. 3.
Fig. 5 illustrates the manner in which the circuits of Fig. 1, Fig. 2, and Fig. 3 are joined together.

Referring now to the drawing, Fig. 1 shows a pulsing circuit which comprises a pulse frequency divider for providing a two phase input to the counter, a between digit steering circuit for providing discrimination in the storage of the first and second digit in the two-stage register of the instant embodiment and means for activating the end of digit storage in the register and for clearing the counter circuits after the digit has been registered. The pulsing circuit is driven by a dial 1, such as is embodied in a telephone subset, which comprises off-normal contact 2 and dialing impulse contacts 3. Contacts 2 and 3 are placed in series and are connected through conductors 4 and 5 of the subscriber loop to a connector 6, such as would be located in a central office. Advantageously, other subscribers are connected to connector 6 through conductor pairs such as 7 and 8, 9 and 10, and 11 and 12.

In general, when a subscriber originates a call by lifting his receiver the connector is seized and connects the calling line to an idle originating register circuit. This operation is described in detail in the above-identified Busch patent. It will be assumed that the subscriber at the subset having dial 1 desires to originate a call and, in accordance with the above-described procedure, dial 1 is connected by connector 6 to the pulsing circuit of the originating register. When the subscriber pulls dial 1 off normal, the closure of contacts 2 causes relay 13 to operate by completing a current path between potential source 214 and ground. Relay 13 comprises single-pole double throw contacts 14, the armature of which is connected to ground. The energization of relay 13 places ground on lead 15 and completes a current path between potential source 16 and ground, thereby energizing relay 17 and closing contacts 18 and 19 thereof. Relay 13 releases and reoperates each time the operation of the dial opens the circuit through contacts 3, but advantageously relay 17 is a slow release relay, such as is well known in the art, and holds over the entire digit.

Upon the first release of relay 13, a path is completed from ground, the upper contact members of contacts 14, contacts 18, the windings of relay 20, and through potential source 21 to ground. Relay 13, upon its first release, also closes a circuit from ground, the upper members of contacts 14, contacts 19 of relay 17, contacts 26 of relay 25, contacts 28 of relay 27, the windings of relay 29, and potential source 30 to ground.

The energization of relay 20 completes a path from ground, the lower contact members of contacts 22, the windings of relay 23 and through potential source 24 to ground.

The operation of relay 23, which advantageously is of the slow release type, causes relay 31 to be operated through the obvious path from ground to contacts 33 of relay 23, contacts 35 of relay 31, the windings of relay 31, resistance 36 and potential source 37. The energization of relay 31 causes contacts 38 to close and thereby hold relay 31 in the operated condition and further closes contacts 39 to place conductor 41 at ground potential. At the same time the operation of relay 31 opens contacts 40, which if relay 64 is operated as explained below, removes ground from conductor 72. In the two-stage register of the instant embodiment the operation of relay 31 prepares a complete circuit through the write windings of the magnetic cores of the first stage of the register for the registering of the first digit.

The operation of relay 29 in the manner described above during the time that relay 13 is released places a voltage from potential source 43 on conductor 47, this voltage being derived through contacts 42 of relay 25 and contacts 44 of relay 29. As described in greater detail below, conductor 47 is connected to the advance windings of the magnetic cores of the counter circuit shown in Fig. 2, and this voltage provides the first advance pulse to the counter.

As the dial continues its cycle, the dial contacts again close the circuit through the windings of relay 13 thereby reoperating that relay and removing ground from the windings of relays 20 and 29. Relay 20 advantageously is of the slow release type and is held in its operated condition until relay 13 again releases. Relay 29 is held in the operated condition by the operation of relay 25 through a circuit comprising the contacts to ground on relay 29, contacts 34 of relay 23, the windings of relay 25 and normally closed contacts 28 of relay 27. The operation of relay 25 by opening contacts 42 removes the voltage from conductor 47 to the counter to terminate the first advance pulse.

When the dial again opens the circuit corresponding to the second pulse, relay 13 again releases to operate relay 27. The current path in this step is from ground, the upper contact members of contacts 14 of relay 13, contacts 19 of relay 17, the lower contact members of contacts 26, the secondary windings of relay 25, the windings of relay 27, and through potential source 49 to ground. The operation of relay 27 with the subsequent opening of contacts 28 opens the circuit to relay 29, thereby releases that relay, and closes contacts 46 to place a voltage from potential source 45 on conductor 48 connected to the advance windings of the counter to provide a second advance pulse thereto. When relay 13 reoperates due to the continued operation of the dial ground is removed from the pulse frequency dividing circuit and both relays 25 and 27 release to terminate the second advance pulse.

The release of relay 13 for the third time again operates relay 29 as before and the cycle is repeated, relay 29 being operated on odd number pulses and relays 25 and 27 being operated on even number pulses to provide alternate advance pulses on conductors 47 and 48 as required by the magnetic core counter circuit.

When the dial returns to normal at the termination of the first digit, off-normal contacts 2 open and relays 17, 20 and 23 release. However, relay 23 is of the slow release type and its release is dependent upon the release of relay 20. Thus during the interval between the time when relay 20 is released and relay 23 is released, the end-of-digit storage in the register is accomplished.

Relay 50 operates upon the release of relay 20 through a circuit consisting of ground, the upper members of contacts 22, contacts 225, contacts 60, contacts 58, the windings of relay 50, and potential source 51. This results in the operation of relay 54 through the obvious circuit of ground contacts 52 of relay 50, the windings of relay 54, and potential source 69. The operation of relay 50 also places ground through contacts 53 on conductor 62. As further explained below, grounding conductor 62 operates a transfer relay in the magnetic core counter circuit to transfer the counter output leads from a terminating resistance to the magnetic cores of the register and further opens the circuit for clearing the counter in preparation for the next digit transmitted from the dial to insure that the counter information is read out before the counter is cleared.

The operation of relay 54 closes contacts 56 and places ground on conductor 70, thereby providing an additional pulse on one of the advance leads to the counter through the pulse frequency dividing relays and conductors 47 or 48 for readout of the counter. The operation of relay 54 also operates relay 59 through the circuit comprising ground, contacts 57, the windings of relay 59 and potential source 71. Relay 59 holds through the circuit comprising contacts 22 of relay 20, contacts 25 of relay 23 and contacts 60 of relay 59. The operation of relay 59 also places a voltage pulse from potential source 72, contacts 32 of relay 23, and contacts 61 of relay 59 on conductor 63, which pulse is used to clear the counter and ready it for the next digit when the transfer relay in the counter circuit releases. The operation of relay 54 opens contacts 58 to release relay 50. The release of relay 50 opens contacts 52 to release relay 54. The operation of relay 59 opens contacts 60 to prevent relays 50 and 54 from reoperating. The release of both relays 50 and 54 releases the transfer relay in the counter circuit by removing ground from conductor 62. Upon the release of the transfer relay, a clearing pulse is provided to the counter on lead 63 through contacts 61 on relay 59, contacts 32 on relay 23 and potential source 224.

The release of relay 23, as described above, removes ground from contacts 65 of relay 64, thereby permitting relay 64 to operate in parallel with relay 31 through contacts 38 of relay 31, the windings of relay 64, resistance 66, and source of potential 37. Relay 64 is not operated until this time.

On the second digit, the pulsing circuit performs much in the same manner as described for the first digit with the exception that as soon as relay 23 operates on the first release of relay 13, relay 31 of the steering relays is shunted down through a circuit comprising ground, contacts 33 of relay 23 and the lower members of contacts 65 of relay 64 to provide ground on one side of the winding of relay 31. Ground on the other side of the winding is provided through a circuit comprising ground and contacts 38. This leaves only relay 64 of this portion of the pulsing circuit operated. Ground then is provided on conductor 72 through closed contacts 40 and 68 to enable the second stage of the register circuit to record the digit transferred from the counter.

Thus it is clear that the alternate combination of relay 31 operated with relay 64 released, and relay 64 operated with relay 31 released provides the means for registering the first digit in one stage of the register cores and the second digit in the other stage of the register cores of the illustrative two-stage register shown in the instant embodiment. That is, relay 31 operated with relay 64 released prepares the circuit from the counter through the write windings of the first stage register cores; relay 64 operated with relay 31 released prepares the circuit from the counter through the write windings of the second stage register cores. Manifestly, if a register with a larger number of stages is utilized it is understood that those skilled in the art may adapt the steering circuit to prepare each succeeding stage of the register to receive a digit from the counter in a similar manner without departing from the spirit and scope of the invention.

Figure 2:
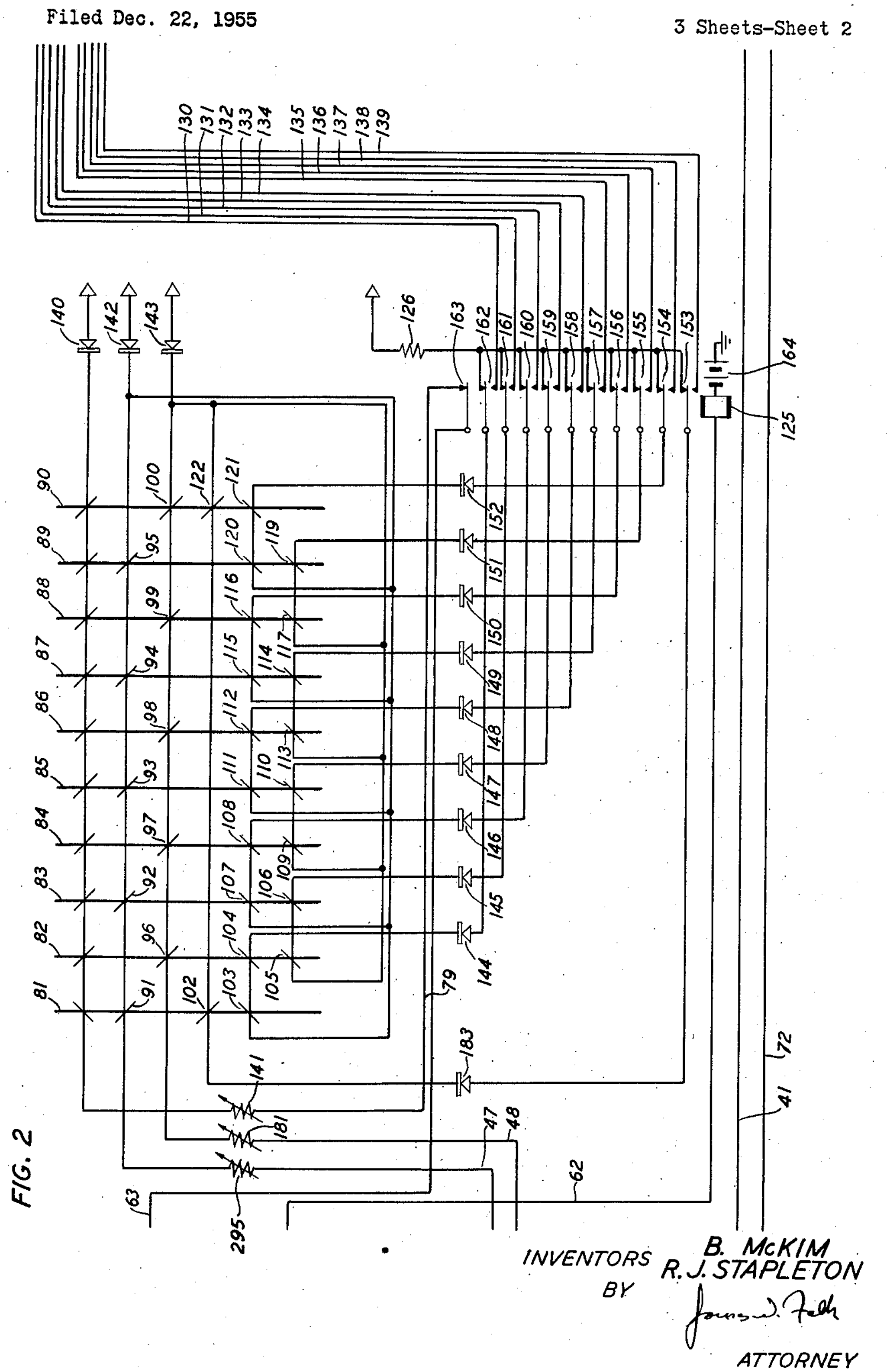
Fig. 2 is a schematic representation in mirror symbol notation of one specific embodiment of magnetic core counting circuit which may be utilized with the present invention.

Fig. 2 depicts a counter circuit which may be utilized to receive the number impulses from the pulsing circuit in accordance with the invention. Advantageously, the counter may be of the stepping magnetic core type and is so illustrated in the illustrative embodiment shown in Fig. 2. In this specific embodiment a first or odd group and a second or even group of magnetic cores are alternately serially connected such that a pulse in a core of the odd group is transferred to a core of the even group and then retransferred to the next succeeding core of the odd group progressively throughout the counter subject to the control of a pair of sources of advance pulses, each associated with one of the core groups.

For purposes of simplifying the disclosure of this invention, the magnetic cores of the counter circuit are depicted in mirror symbol form, an extensive discussion of which appears in an article entitled "Pulse Switching Circuits Using Magnetic Cores," by M. Karnaugh, published in the Proceedings of the I.R.E., volume 43, No. 5, at pages 570 through 583. Briefly, each magnetic core has two stable states which may be designated as set and normal. In Fig. 2 each core is represented by the heavy vertical lines numbered 81 through 90, respectively. The short lines defining 45 degree angles with the cores represent windings on the cores and are termed winding mirror symbols. The horizontal lines through the intersection of these vertical and 45 degree lines represent the circuits connected to the windings. When a current flows into a winding, the resulting magnetic flux can be obtained by "reflecting" this current off the winding mirror symbol. The direction of the induced voltage in any winding on the core can be obtained by reversing the direction of the above-mentioned magnetic flux and reflecting from the associated mirror symbol for the winding.

In the counter circuit depicted in Fig. 2 the upper row of windings on the cores 81 through 90, inclusive, are reset windings and are connected in series through a diode 140 to ground at one end and through a resistance 141 to conductor 79 at the other so that a single reset pulse on conductor 79 will place core 81 on the set condition and cores 82 through 90 in the normal condition. Windings 91, 92, 93, 94 and 95 on cores 81, 83, 85, 87 and 89 respectively, are advance windings and are serially connected to paralleled transfer windings 103, 107, 111, 115 and 120 and to ground through diode 142 at one end and to the advance pulse conductor 47 through a resistance 295 at the other. Similarly, windings 96, 97, 98, 99 and 100 are advance windings on the even cores 82, 84, 86, 88 and 90 respectively, and are serially connected to paralleled transfer windings 105, 109, 113, 117 and 122 and to ground through diode 143 at one end and to the advance pulse conductor 48 through the resistance 181 at the other. In addition, each core has a pair of transfer windings utilized for transferring a pulse to a succeeding core which transfer windings are numbered 102 and 103 on core 81, 104 and 105 on core 82, 106 and 107 on core 83, 108 and 109 on core 84, 110 and 111 on core 85, 112 and 113 on core 86, 114 and 115 on core 87, 116 and 117 on core 88, 119 and 120 on core 89, and 121 and 122 on core 90. One of the pair of transfer windings of each core which is effiectively an output winding, is connected to a transfer winding, which is effectively an input winding, of the next succeeding core. Winding 102 of core 81 and winding 122 of core 90 are connected together. In addition, windings 102, 104, 106, 108, 110, 112, 114, 116, 119 and 121 each are connected through separate diodes 183 and 144 to 152, respectively, to the armatures of contacts 153 to 162 respectively of relay 125.

Initially all of the cores in the counter are in the normal state except for the first core, core 81, which is in the set state. This arrangement is the cleared state, i.e., the state in which the cores are left by the counter clearing pulse applied over conductor 79 from conductor 63 of the pulsing circuit through contact 163 of relay 125. Alternate advance pulses from the pulse frequency dividing relays of the pulse circuit shown in Fig. 1 are applied on conductors 47 and 48 to the advance windings of the cores and shift each core in succession from the set state to the normal state and also shift the next core in the counter from the normal state to the set state. For example, the first advance pulse on conductor 47 shifts core 81 from the set to the normal state and thereby induces a voltage in winding 103 of that core as explained more fully in M. Karnaugh Patent 2,719,961, October 4, 1955. The resulting current passes through winding 104 of core 82, which is connected in series with winding 103 of core 81 and thereby sets core 82 to the set state. As stated above, a transfer winding of each core is connected through a rectifier to a separate set of contacts of relay 125 and through these contacts to a resistance 126 and ground when relay 125 is in the unoperated condition. Consequently, the current due to the resetting of a core passes through the input winding of the next succeeding core and continues through its associated contacts of relay 125 and resistance 126 to ground. The second advance pulse which comes into the counter on conductor 48 shifts core 82 from the set to the normal state, sets core 83 to the set state, and again furnishes an output pulse through its associated contacts on relay 125 to the terminating resistance 126 and ground. In a similar manner, succeeding pulses alternating between conductors 47 and 48 will step from core to core through the counter and furnish output pulses in succession to the terminating resistance 126.

At the end of the digit, one core of the counter is left in the set state while all of the remaining cores are in the normal state. Relay 50 of the pulsing circuit, operated at the end of the digit, operates relay 125 of the counter circuit over a circuit comprising ground, contact 53 of relay 50, conductor 62, the windings of relay 125 and potential source 164 to transfer all of the magnetic core counter output leads from the terminating resistance 126 to the input leads 130 through 139 inclusive of the magnetic cores of the register. Relay 54 of the pulsing circuit which is operated at this time then places one additional advance pulse from the pulse frequency dividing relays 25, 27 and 29 to the counter input conductors. This shifts the one core left in the set state to the normal state and places a signal on the counter output lead corresponding to the dialed digit in the register circuit to set the three of the five register cores associated with the digit.

When relay 125 releases in the manner explained heretofore, after the release of relay 54 in the pulsing circuit, all of the cores of the counter are shifted to the cleared state, that is, core 81 to the set state and the remainder to the normal state, to prepare the counter for the next digit.

Figure 3:
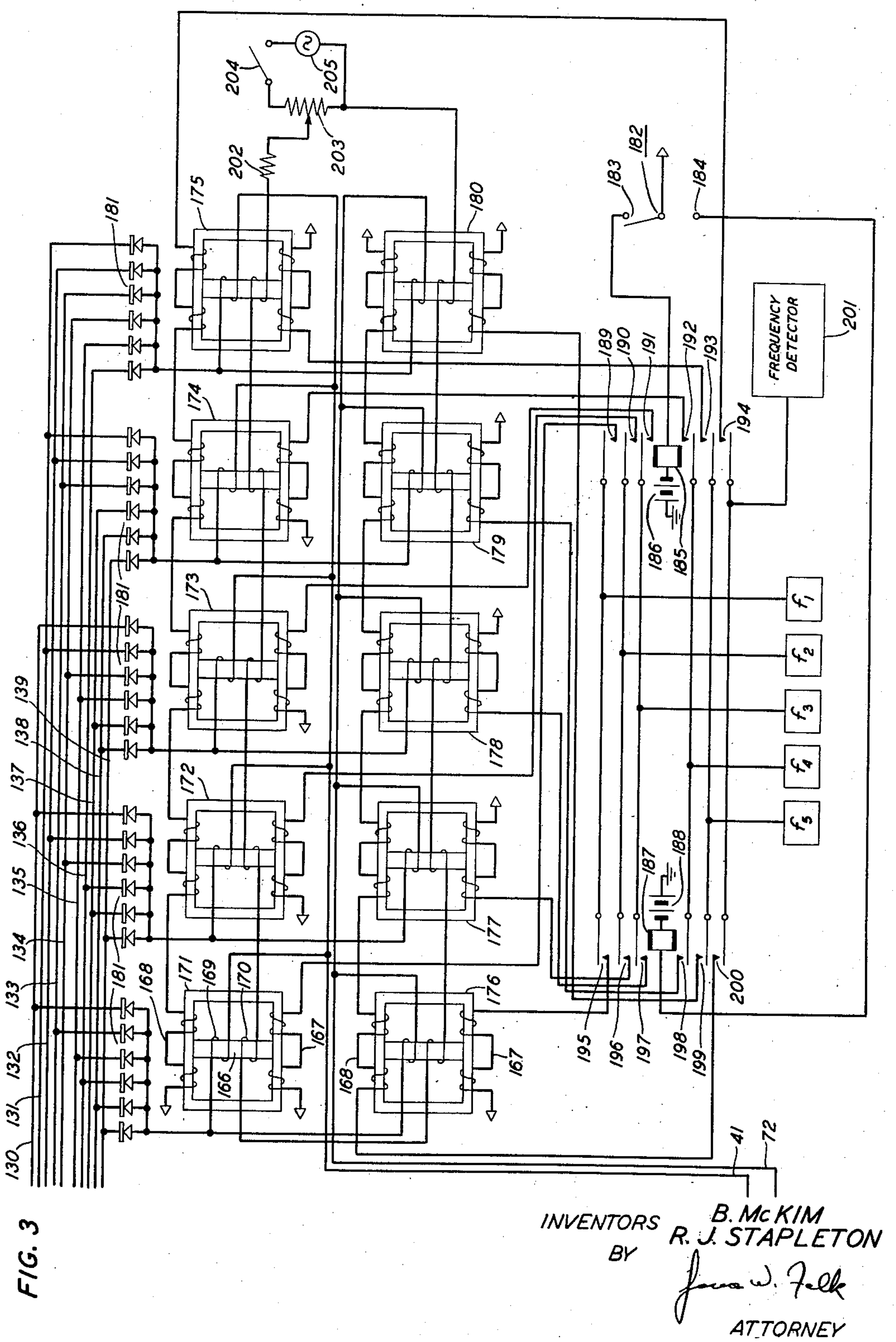
Fig. 3 is a schematic representation of a two-stage magnetic core register in accordance with the invention.

Fig. 3 depicts a two-stage magnetic core register and readout circuit which advantageously may be utilized with the invention. Each stage of the register comprises five magnetic cores in which a number is registered by setting a unique combination of three out of the five cores. In accordance with a feature of this invention each magnetic core of the register circuit is capable of having the information stored therein read out a number of times without alteration or destruction of the magnetic state of the core.

Fig. 4 depicts a core of the type utilized in the register circuit of Fig. 3. Advantageously, the core comprises an outer loop of soft iron 165 and a central leg or crossbar of high remanence iron 166. The magnetic properties of a composite core of this type are such that the outer loop 165 is saturated when the central crossbar 166 is magnetized.

Symmetrically split with respect to the crossbar 166 on one leg of the outer loop 165 is a read winding 167, the two equal parts of which are connected to be in series aiding as far as the outer loop is concerned. Similarly, the output winding 168 is split into two equal parts with respect to the crossbar and advantageously is located on a leg of the outer loop opposite that containing the read winding. The parts of output winding 168 also are connected in series aiding with respect to the outer loop. With this arrangement current flow in either of the read or output windings does not develop any magnetomotive force across crossbar 166. Hence, the magnetic state of the latter will be entirely unaffected by the readout operation and no voltage will be induced in the write or erase windings.

Information is written into the core by the application of a signal to the write winding 169 to place the core in a set condition. Current flow in this winding produces a flux which splits evenly between the two arms of the outer loop. This flux will produce equal but opposite voltages in the read and output windings and hence no current will flow in these windings during the writing operation. The core may be reset by applying a signal to the erase winding. As in the case of writing, no current will flow in the read or output windings due to the symmetry of these windings.

In accordance with an aspect of this invention the core is set by the application of a signal impulse to winding 169. This leaves crossbar 166 magnetized and the outer loop 165 saturated. A read pulse of suitable amplitude applied to read winding 167 does not unsaturate the outer loop and therefore little or no output signal is produced in the output winding. As previously explained, this pulse does not affect the state of crossbar 166.

In accordance with another aspect of the invention the core may be reset to the normal states by the application of a signal comprising a damped sine wave to erase winding 170. This demagnetizes the crossbar and consequently leaves the outer loop unsaturated. A signal impulse applied to the read winding when the outer loop is in the unsaturated condition will, by ordinary transformer action, produce a pulse in output winding 168. Again, the read pulse has no effect on the crossbar.

Thus, it is clear that when the magnetic core is in the magnetized or set state it exhibits the characteristics of a very poor transformer and little or no output signal will be produced in response to an input pulse on the write winding. Conversely, when the core is in the demagnetized or normal state, it exhibits the characteristics of an ordinary transformer and an output signal will be produced in response to a write pulse. It therefore can be seen that such an arrangement may be utilized as a magnetic core memory device possessing nondestructive readout in the pulse register of the instant invention.

Each of the register stages of the circuit of Fig. 3 comprises five magnetic cores of the type described above.

The write windings of the cores of each stage each are connected through a plurality of diodes 181 to various ones of the input leads 130 through 139, the input windings of corresponding cores in the two register stages being connected in parallel to the same input leads. Each input lead is connected to three cores of each stage, as, for example, lead 130 is connected to cores 171, 172, and 173 of the first stage and cores 176, 177 and 178 of the second stage. In a similar manner each of the other input leads is connected to three cores in each stage, there being a unique combination of cores associated with each lead. Thus, when a digit is transferred from the counter upon the energization of relays 54 and 125 at the end of the digit, in the manner explained above, only the input lead associated with that digit will have a signal impulse thereon and, consequently, only the three magnetic cores connected to that input lead will be set in the magnetized condition. Initially all of the cores in the register are in the demagnetized state, and in the particular illustrative embodiment illustrated herein, three-out-of-five of the cores of a register stage are set corresponding to the digit dialed, leaving two-out-of-five cores to act as ordinary transformers for readout purposes.

The write windings of each of the cores of the first stage of the register cores 171 through 175 are connected to conductor 41 and therethrough to the relays 31 and 64 of the steering circuit disclosed in Fig. 1. Similarly, the write windings of each of the cores of the second stage of the register, cores 176 through 180, are connected through conductor 72 to the steering circuit relays. As explained heretofore, during the time that the first digit is being dialed, ground is placed on conductor 41 to provide the completing circuit path for the registering of the digit at the end of the last pulse. During this time, conductor 72 is open thus permitting the entire pulse from the counter to pass through the write windings of three of the first stage register cores. As the second digit is dialed, the situation is reversed and the output pulse from the counter at the end of the digit sets only the three associated cores in the second stage of the register.

After the two digits have been dialed and consequently stored in the cores of the register circuit, these digits may be read out of either stage without affecting or destroying the state of the cores by the operation of switch 182. Switch 182 has its armature connected to ground, contact 183 connected through the windings of relay 185 to potential source 186, and contact 184 connected through the winding of relay 187 to potential source 188.

Relay 185 has six sets of contacts of which contacts 189 through 193 are respectively connected to the read windings 167 of cores 171 through 175 of the first register stage. Similarly, relay 187 has six sets of contacts of which contacts 195 through 199 are respectively connected to read windings 167 of cores 176 through 180 of the second register stage. The output windings 168 of each of the first stage cores are connected in series from ground to contacts 194 of relay 185 and therethrough upon operation of relay 185 to frequency detector and indicator 201. In a similar manner output windings 168 of the second stage cores are connected in series from ground through contacts 200 of relay 187 to frequency detector 201 upon operation of relay 187. A source of distinct frequency signal is connected in common to each pair of corresponding relay contacts of the register stages, $f_1$ being connected to contacts 189 and 195, $f_2$ being connected to contacts 190 and 196, $f_3$ being connected to contacts 191 and 197, $f_4$ being connected to contacts 192 and 198, and $f_5$ being connected to contacts 193 and 199.

In the operation of the invention when nondestructive readout of the digit stored in the first register stage is desired, switch 182 is operated to close contacts 183, thereby energizing relay 185. This causes contacts 189 to 194 inclusive, to close and, consequently, connects the signal frequency sources $f_1$, $f_2$, $f_3$, $f_4$ and $f_5$ to the read windings 167 of their associated cores in the first register stage. This places the five signal frequencies through the read windings of cores 171, 172, 173, 174 and 175, each frequency passing through the windings of only one core. In accordance with an aspect of the invention, as explained above, the two frequencies on the cores that were not set in the magnetized state from the counter output are transmitted through the cores by transformer action and are applied from the core output windings via closed contacts 194 to the frequency detector 201 to indicate the first digit. Frequency detector 201 advantageously may comprise a plurality of filter circuits or may be any other of the large number of frequency discriminating devices well known in the art. The remaining three frequencies effectively are blocked by the poor transformer characteristics of the set cores and thus do not appear in the detector output. By this arrangement, each digit is associated with two distinct frequencies at the detector.

By operating switch 182 to close contacts 184, the digit stored in the second stage register cores, cores 176 to 180 inclusive, may be demonstrated. In this case, the closeness of contacts 184 operates relay 187 to close contacts 195 through 200. This places the five different frequency signals from sources $f_1$, $f_2$, $f_3$, $f_4$, and $f_5$ on the read windings 167 of the second stage cores, two of which are in the set condition and three of which are in the normal condition. In the manner explained above, only the two out of the five frequencies corresponding to the dialed digit would be passed by the cores to the frequency detector to indicate the stored digit. The reading out of the digits stored in the stages of the register does not change the state of the cores. Therefore, the stored digits can be demonstrated more than once without resetting the register cores.

An erase winding 170 is connected to the center crossbar of each of the magnetic cores of register stages. All of the erase windings are connected in series and are connected to a source of alternating current potential comprising a generator 205, a switch 204, a variable resistance 203, and a resistance 202 connected to the arm of variable resistance 203. The register cores can all be cleared after the information stored therein is no longer needed by closing switch 204 and operating variable resistance 203 to produce a decaying alternating current potential across the cores. This damped signal serves to demagnetize the center crossbar of each core and to return the register to the cleared or normal condition in preparation for the entry of new digits therein.

It is to be understood that the above-described arrangements are illustrative of the application of the principles of the invention. Numerous other arrangements may be devised by those skilled in the art without departing from the spirit and scope of the invention.

What is claimed is:

1. An electrical pulse data processing network comprising in combination, a source of information digits, each digit comprising one or more electrical pulses, intermediate storage means connected to said source for registering each of said digits, said intermediate storage means comprising a plurality of storage magnetic cores each settable to an active or a nonactive condition wherein a different one of said storage magnetic cores is set to the active condition for each unique digit received from said source, and magnetic core register means connected to said intermediate storage means and controlled by the storage magnetic cores in active condition therein for registering each of said information digits in a coded manner, each of the register magnetic cores having winding means thereon for enabling said digits to be repeatedly read out of said register means without changing the state of magnetization of said register magnetic cores.

2. In a signaling system, means for generating signal impulses, counting means responsive to said signal impulses for establishing a count in accordance therewith, registering means comprising a plurality of magnetic cores connected to said counting means, each of said magnetic cores being adapted to assume one of two stable states, transfer means operative upon the cessation of a first group of impulses for selectively setting to one stable state a given combination of said magnetic cores, said combination being associated with the count contained in said counting means, and readout means connected to said magnetic cores for reading out the information stored therein without changing the states of said magnetic cores.

3. In a signaling system, means for generating on information signal, said signal comprising a plurality of impulses, means responsive to said signal for establishing a count as determined by the number of said impulses, register means controlled by said count for storing said information signal, said register means comprising a plurality of magnetic cores each adapted to be placed in one of two stable states of magnetization in accordance with said information signal, and means connected to said magnetic cores for reading out said information signal stored therein without destroying the states of magnetization of said cores.

4. In combination, a source of information signal impulse groups, counting means connected to said source for receiving said impulse groups and establishing a count in accordance with the number of impulses in a group, a register comprising a plurality of magnetic cores each adapted to be selectively placed in a set or normal state, transfer means connected to said counting means and said register for setting selected ones of said magnetic cores in accordance with the count in the counting means and means connected to said register for repeatedly reading out the information signal stored therein without destroying the state of said magnetic cores.

5. A combination in accordance with claim 4 in which said counting means comprises a plurality of magnetic cores each adapted to be in a set or a normal condition wherein a count is established by having only the magnetic cores associated with the count in the set condition and all of the remaining cores in the normal condition.

6. A combination in accordance with claim 5 wherein said transfer means comprises a relay having a plurality of contacts, means for inductively connecting respectively each of said contact elements to each of said magnetic cores of the counting means, and means for inductively connecting each of said contact elements to various combinations of the magnetic cores of the register whereby the operation of said relay completes a circuit between the set magnetic core of the counting circuit and its associated combination of magnetic cores of the register to transfer an indication of the stored information signal from the former to the latter.

7. In a telephone system, dial means for generating a plurality of digit impulses, counting means comprising a plurality of bistable magnetic cores responsive to said impulses for determining a digit generated by said dial means, a plurality of magnetic core register stages connected to said counting means, transfer means connected to said counting means and responsive to the cessation of a group of impulses representing a digit for transferring the digit determined in said counting means to one stage of said register means, steering means for transferring each digit generated by said dial means into a different stage of said register means, and readout means connected to the register means for selectively detecting the digit stored in each stage of said register means without changing the magnetic state of the magnetic cores or destroying the digits stored therein.

8. In a signaling system, information storage means comprising a plurality of magnetic cores, each core being adapted to be placed in one of two stable states, one of said states indicating a set condition and the other a normal condition, a write winding on each core, means connected to each writing winding for individually placing selected ones of said cores in the set condition, a read winding on each core, signal means connected to each read winding for placing a signal of unique frequency thereon, an output winding on each core, frequency detecting means connected to the output windings of all of said cores for determining the magnetic state of each of said cores and means connected to said cores for placing each of them in a normal condition to prepare for the storage of new information.

9. In a telephone system, a dial pulse register comprising a plurality of magnetic cores, each of said cores including an outer loop of low remanence magnetic material, a central crossbar defining two inner loops, a write winding coupled to said central crossbar, a read winding coupled to said outer loop, said read winding comprising a pair of series connected windings each coupled to a leg of said inner loops, and a pair of output windings coupled to said outer loop, each output winding comprising a pair of series connected windings each coupled to a leg of said inner loops.

10. In a telephone system, a dial pulse register in accordance with claim 9 further comprising a source of information signals and means for connecting said source to the write windings of selected ones of said magnetic cores for magnetizing said crossbar and thereby saturating said outer loop.

11. In a telephone system, a dial pulse register in accordance with claim 10 further comprising a source of signals of different frequency, each signal being applied to the read windings of one of said magnetic cores, and a frequency detector connected to the output windings of said magnetic cores, whereby the signals applied to the magnetized cores substantially are blocked by said cores and the signals applied to the unmagnetized cores are passed to said frequency detector for indicating the information in said register.

12. In a signaling system, a register comprising a plurality of magnetic cores, each core having an outer loop of low remanence material and a center crossbar of high remanence material, an input winding on each of said cores, means connected to each input winding for setting certain ones of said cores in accordance with information to be stored therein, an output winding connected to each core, and readout means for placing said information on the output windings without changing the information status of said cores, said readout means comprising a read winding on each core, said read winding being coupled to said outer loop symmetrically with respect to said crossbar, and alternating current signal means connected to each read winding for applying a signal of distinct frequency thereto.

13. In a signaling system, a register in accordance with claim 12 further comprising an erase winding coupled to the center crossbar of each of said magnetic cores and signal means connected thereto for resetting said certain ones of said cores.

14. A dial pulse register comprising a plurality of magnetic cores, each of said cores including a write winding, a read winding, and an output winding and being adapted to be in a normal or a magnetized condition, said cores exhibiting the characteristics of a good transformer when in the normal condition and the characteristics of a very poor transformer when in the magnetized condition, signal means connected to said write windings for writing information into said cores by setting certain ones thereof in a magnetized condition in accordance with said information, and readout means for demonstrating said information on said output windings by placing a signal of distinct frequency on each of said read windings whereby only the cores in the normal condition will pass the signal frequencies applied thereto, the magnetic states of each of said cores being unchanged by said signal frequencies.

15. A dial pulse register in accordance with claim 14 wherein each of said magnetic cores comprises an outer loop of low remanence magnetic material and a crossbar of high remanence magnetic material, said write winding being coupled to said crossbar and said read and output windings each being coupled to said outer loop in symmetry to said crossbar.

16. A dial pulse register in accordance with claim 15 further comprising an erase winding coupled to said crossbar for placing each of said magnetic cores in the normal condition.

No references cited.